July 9, 1935.  H. BROCHE  2,007,741
METHOD OF DESULPHURATING COAL DISTILLATION GASES
Filed Oct. 18, 1932
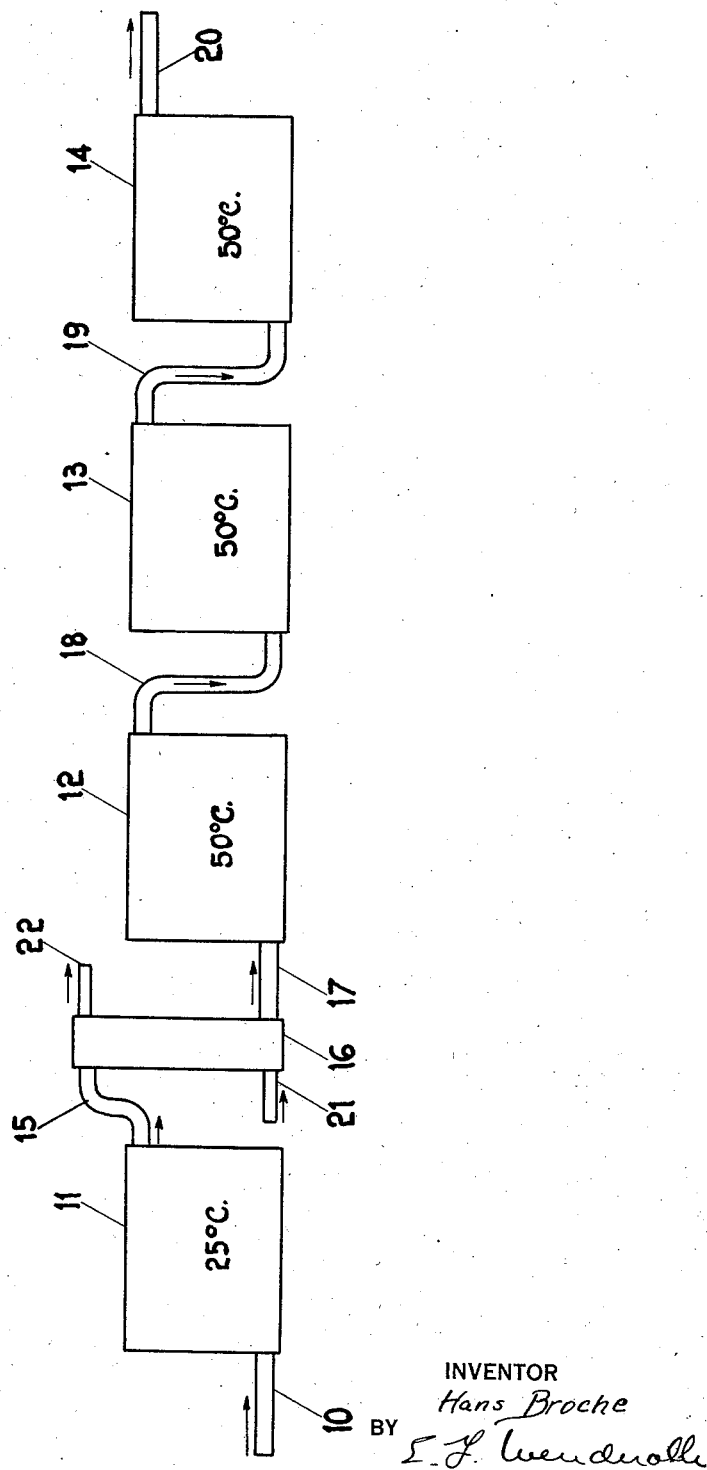
INVENTOR
Hans Broche
BY
ATTORNEY Patented July 9, 1935

2,007,741

UNITED STATES PATENT OFFICE 2,007,741

METHOD OF DESULPHURATING COAL DISTILLATION GASES

Hans Broche, Essen/Ruhr, Germany

Application October 18, 1932, Serial No. 638,431
In Germany October 23, 1931

9 Claims. (Cl. 23—3)

My invention refers to dry purification of coal distillation gases from hydric sulphide ($H_2S$) contained therein by means of treating the gases with natural masses, containing iron oxide, as limonite, or with artificial masses, as "Lux-mass". It is well known that such masses can be used as such or after being activated by certain additions such as calcium carbonate. It is further known that such masses if being saturated with sulphur can be freed therefrom by extraction and can then be reactivated.

The purification of the gases by the masses referred to has been carried on till at present generally in such way that these masses have been filled into different single aggregates or units, as for instance containers, cases, tanks, towers or the like, and a plurality of them, mostly from 3 to 4, have been assembled to one purifying system. The gas to be purified has been led through these three or four single purifiers in succession and freed thereby from hydric sulphide (sulphuretted hydrogen).

As a rule, at a suitable stage air and/or steam has been added to the gas under treatment in order to carry through, besides the combination of the hydric sulphide with the iron contained in the purifying mass, a regeneration of the iron sulphide ($FeS_2$) so formed in a foregoing unit hereby separating in a second or following unit the elementary sulphur from the converted purifying mass. It appears therefrom that air and/or steam are regularly to be added after the first, or a following unit.

This dry purification of gas works quite reliably. A great disadvantage of this process consists, however, in that the regular flow of the gas through the tanks or cases must not exceed a velocity of from 5 to 7 millimetres per second, if an entire desulphuration of the gas under treatment and a sufficient concentration of the sulphur in the mass is to be obtained. Therefore it is not possible to load the purifiers with larger volumes of gas and to lead through them larger quantities of gas per time unit respectively. Temporarily such purifiers have already been operated on about the double velocity of the gas, as mentioned before, that is to say, a greater loading of the system has been admitted, but such operation was only possible for some hours or a few days, since otherwise sulphuretted hydrogen appeared rather rapidly in the gas to be purified.

At any rate, it has been impossible up to the present to continuously operate the purifying systems with greater loads of gas to be purified than indicated before.

The invention obviates this inconvenience and increases remarkably the quantities of the gas to be purified per time unit. According to the invention the gas leaving, say the first or second purifier unit is heated so that the further treatment of the gas in the subsequent purifying unit or units is carried through at raised temperatures.

Investigations have proved that the removal of the major quantities of sulphuretted hydrogen from the incoming crude gas by the dry gas purifying masses occurs extremely rapidly, rendering it possible to remove in general far more than half of the original content of sulphur of the gas in the first purifier unit, sometimes even 90% of this sulphur content and more. Even if such first purifying unit is treating gas flowing through it with considerably higher velocities, the removal of the major portion of the sulphuretted hydrogen from the crude gas will successfully be done. Therefore in the following units of the purifying system only the fine purification of the gas has to be done but needing a considerably longer time due to the decreased activity of the mass being converted to a large extent into iron sulphide and the reduced concentration of the sulphur in the gas. In this instance the velocities and loads mentioned before must not be exceeded, if it is desired to produce an absolutely pure gas.

Besides the removal of the sulphur from the gas through dry purification, the regeneration of the iron sulphide formed in the masses is to be carried out simultaneously, as mentioned before, in a second and following unit in the path of the gases.

This regeneration of the iron sulphide in a second or following purifying unit likewise occurs considerably slower than for instance the reception of the major quantities of the sulphuretted hydrogen in the first purifying unit. But only then, if the iron sulphide being formed is regenerated again permanently, is it possible to operate a system of purifiers over an extended period and to reach sufficient concentrations of sulphur in the purifying mass. The slow regeneration of the iron sulphide up to the present was a further reason for keeping the velocities of the gas in the units of a purifying system at a low figure. If operating the purifier at higher velocities of the gas, the purifier would become ineffectual very quickly, since the regeneration of the iron sulphide could not keep pace with the quicker binding of new sulphuretted hydrogen by the mass but would lag behind.

From this it follows, that there occur with the dry purification of gas rapid reactions, on one hand, namely the removal of the major portions of the initial sulphuretted hydrogen in a first unit, and slow reactions in a second, or following unit, on the other hand, namely the removal of the last remainders and traces of the sulphur from the gas and the regeneration of the mass. The slow reactions, however, determine the speed of operation of the total plant or system. One is not allowed to actually utilize the high velocity of the gas admissible during the removal of the major portions of sulphur in a first purifier unit in order to fully finish the slow reactions occurring in the purifier unit or units following a first unit.

This invention overcomes this drawback and renders it possible to operate the whole purifying plant at the same high velocities which are admissible in a first unit of the system of purifiers, in that the slow reactions in the remaining units of the system are accelerated through a rise in the temperature of the gases under treatment whereby the speed of the reactions taking place in the following units is equalized about to that of the rapid reactions in a first purifying unit.

For instance, the operation can be carried on in such a manner that the gas roughly cleaned in a first purifying unit is heated in suitable heat exchanging devices, for instance by exhaust steam, up to temperatures lying above the normal daily temperature, particularly above 30 degrees centigrade. The gas can be kept at such suitable temperature in the following units either by means of a suitable insulation of the containers, or even by supplying additional heat. Thus, according to the invention, the temperature of the gas in the following purifier units is principally raised by about 10 degrees centigrade, or more, above the temperature of the gas in a first purifying unit. The value of the increase in temperature is governed by and to be chosen in accordance to the property and condition of the respective gas under treatment, as the contents of sulphur and cyanogen in the gas etc. vary. For instance, it may prove suitable to work in a first purifying unit at the customary daily temperatures of from 15 to 25 degrees centigrade or even somewhat more, and thereupon to maintain the gas by external supply of heat at a temperature of from 40 to 50 degrees centigrade, or more, in a following unit.

In this way it is possible to operate the purifying system at higher speeds of gas than the customary ones, and to load the plants with quantities of gas up to double the amount, and more, in comparison with those quantities admissible to-day in carrying out the operation with uniform temperature or cold purification.

In carrying out the invention, a heat exchanging device may be provided for a system of purifiers and the roughly cleaned gas may be heated after leaving a first purifying unit and then passed to additional purifying units. But it is also possible to provide a special heat exchanging device, or steam coils, for each separate tank, tower or the like and to heat the units thereby separately. In all instances it is possible to carry through the alternate connection of the units, customary at present, which means that in a certain turn the purifying unit in the last place is made to be the first unit, the activity of which has been considerably reduced by the reception of sulphur and its combination with the iron oxide contained in the purifying mass, while now the first purifying unit becomes the second, the second being placed third and so on. As mentioned hereinbefore, such regeneration is done by introducing steam and/or air at a suitable stage, i. e. after a first unit of the series. This so-called "retrograde connection" of the units will assist, in addition, a complete regeneration of the masses in the containers. However, the manner of operation is in no way bound to this kind of connecting the tanks.

In the drawing a diagrammatic view of a system is shown adapted for the performance of the invention. But it is to be understood that the invention is not limited in any way to this example of its performance.

The coal distillation gases, as they are coming from the furnace and are washed in scrubbers or washers and cooled, enter the dry purification system by the pipe 10. This system comprises, in this example, four units 11, 12, 13, 14, the units being of the same capacity. Each unit encases the material adapted for dry purification, containing iron or iron-oxides, or being an artificial purifying material as limonite.

The cool gas enters the first unit in which the purification is done at normal or room temperature of about 25° C. In this first unit the principal amounts (about 85–95%) of sulphuretted hydrogen which are present in the gas, are removed from it, and a kind of raw purification of the gases is done hereby, as far as its sulphur content is concerned. The gases pass now through the pipe 15 in a heater 16, in which their temperature is raised by a minimum of about 10° C. Preferably the gases are heated to about 50° or 60° C. The so heated gases leave the heater through the pipe 17 and enter the unit 12. There remainders of the sulphurated hydrogen are further removed, but at the same time the revivification of the purifying agent begins by the action of oxygen of the air or the steam, previously added to or otherwise contained in the gases, this reaction being considerably accelerated by the heating of the gases. The gases pass then through the pipe 18 in the unit 13, and then through the pipe 19 in the unit 14, and leave the purifying system through the pipe 20. The treatment of the gases in the units 13, 14 is done at about the same temperature, as in the unit 12, i. e. at a temperature at least about 10° C. higher than in unit 11, and preferably at about 50° to 60° C. No additional means are necessary to maintain this temperature after it has once been created in the heater 16, because the revivification in the subsequent units is accompanied by a development of heat, as being an external process. The heating of the gas in the heater 16 is done by heat exchange. The heating medium, for instance steam, enters the heater through the pipe 21 and leaves it through the pipe 22.

Apparently the units form two groups, one of which comprises the first unit 11, while the second one comprises the units 12, 13 and 14. The two groups are operated at different temperatures, and the temperature of the second group is at least about 10° higher than the operating temperature in the first group.

The method according to the invention may be employed to advantage for operation at increased pressure.

The invention is not limited, however, to any special temperatures or apparatus referred to.

What I claim is:

1. In a method of removing sulphur from coal distillation gases by dry purification, passing the gases at a constant speed successively through a plurality of units housing substantially equal amounts of an iron-containing purifying agent the activity of which in each unit diminishes in the direction of the flow of the gases, said units forming two groups connected in series, maintaining the temperature in the group through which the gas flows first substantially at room temperature, and maintaining the temperature in the second group at least substantially 10° C. higher than the temperature in the first group, the number of units of the second group, and the elevation of temperature in the second group above that of the first group, being such that the speed of the gases depends on the rate of reaction in the first group.

2. In a method, as claimed in claim 1, the dimensions of the units for dry purification being substantially equal.

3. In a method, as claimed in claim 1, passing the gases successively at least through three units, and raising the temperature of the gases by at least 10° C. after the first unit.

4. In a method, as claimed in claim 1, raising the temperature of the gases after having passed the first group of purifying units to between about 30° and 60° C.

5. In a method, as claimed in claim 1, adding oxygen containing vapors or gases to the coal distillation gases, at the latest before entering the second group of purifying units.

6. In a method of removing sulphur from coal distillation gases by dry purification and regenerating the dry purification means by oxygen containing vapors or gases admixed to the gases, passing the gases successively through a plurality of units housing an iron-containing purifying agent, said units forming two groups connected in series, maintaining the temperature in the group through which the gases flow first substantially at room temperature and removing the major portion of the impurities in said first group, raising the temperature of the gases admixed with oxygen containing vapors and gases to between about 30° and 60° C. before entering the second group in which substantially all the remaining impurities are removed, and simultaneous regeneration of the purifying agent is effected, and substantially maintaining said raised temperature of the gases while passing said second group.

7. In a method of removing combinations of sulphur from coal distillation gases by dry purification, passing the gases successively through a plurality of units housing an iron-containing purifying agent, the units being of substantially equal capacity and being connected in series, and placing the unit through which the gases have flown first to the end of this series, after said unit has been about saturated with sulphur compounds, operating said units in two groups connected in series, maintaining the temperature in the group through which the gases flow first substantially at room temperature, and maintaining the temperature in the second group between about 30° and 60° C., substantially equalizing hereby the speeds of reaction between the sulphur compounds contained in the gases and the purifying agent in the first group, on one hand, and between the remainders of sulphur compound and the oxygen contained in the gases, and the purifying agent and its combinations with sulphur, on the other hand.

8. In a method of removing sulphur from coal distillation gases by dry purification, passing the gases substantially at the same speed through a plurality of successive units housing iron-containing purifying agents, said units forming at least two groups connected in series, the purifying agent in the group through which the gas flows first being of higher activity than that of the purifying agent in a succeeding group, maintaining the temperature in a group of lower activity at least substantially 10° C. higher than the temperature in the first group and raising thereby the speed of reaction in the group of lower activity.

9. In a method of removing sulphur from coal distillation gases by dry purification and regenerating the dry purification means by steam admixed to the gases, passing the gases admixed with steam at substantially the same speed through a plurality of successive units housing iron-containing purifying agents, said units forming at least two groups connected in series, the group through which the gas flows first containing the purifying agent of substantially full activity, while a successive group contains this agent in a state partially used and to be regenerated, maintaining the temperature in the group through which the gas flows first substantially at room temperature and in a succeeding group at least substantially 10° C. higher.

HANS BROCHE.